(12) United States Patent
Manning

(10) Patent No.: US 10,190,379 B2
(45) Date of Patent: Jan. 29, 2019

(54) INNER DRILLING RISER TIE-BACK CONNECTOR SEAL

(71) Applicant: DRIL-QUIP, INC., Houston, TX (US)

(72) Inventor: Mark A. Manning, Houston, TX (US)

(73) Assignee: Dril-Quip, Inc., Houston, TX (US)

(*) Notice: Subject to any disclaimer, the term of this patent is extended or adjusted under 35 U.S.C. 154(b) by 0 days.

(21) Appl. No.: 15/043,939

(22) Filed: Feb. 15, 2016

(65) Prior Publication Data
US 2017/0234096 A1 Aug. 17, 2017

(51) Int. Cl.
| | | |
|---|---|---|
| *E21B 33/038* | (2006.01) | |
| *E21B 19/00* | (2006.01) | |
| *F16J 15/02* | (2006.01) | |
| *E21B 17/01* | (2006.01) | |
| *E21B 17/18* | (2006.01) | |
| *E21B 21/00* | (2006.01) | |
| *E21B 21/12* | (2006.01) | |

(52) U.S. Cl.
CPC .......... *E21B 33/038* (2013.01); *E21B 19/002* (2013.01); *F16J 15/021* (2013.01); *E21B 17/01* (2013.01); *E21B 17/18* (2013.01); *E21B 21/001* (2013.01); *E21B 21/12* (2013.01)

(58) Field of Classification Search
CPC ...... E21B 33/038; E21B 19/002; E21B 17/01; E21B 17/18; E21B 21/001; E21B 21/12
USPC .................. 166/359; 277/322, 323, 328, 343
See application file for complete search history.

(56) References Cited

U.S. PATENT DOCUMENTS

| | | | | |
|---|---|---|---|---|
| 4,465,134 A | * | 8/1984 | Watkins | E21B 33/043 166/123 |
| 6,070,669 A | * | 6/2000 | Radi | E21B 33/038 166/341 |
| 6,705,615 B2 | * | 3/2004 | Milberger | E21B 33/04 166/182 |
| 6,969,070 B2 | * | 11/2005 | Reimert | E21B 33/035 166/196 |
| 9,303,480 B2 | | 4/2016 | Williams | |

FOREIGN PATENT DOCUMENTS

| | | | | |
|---|---|---|---|---|
| GB | 2201444 A | | 9/1988 | |
| GB | 2233364 A | | 1/1991 | |
| GB | 2381546 A | * | 5/2003 | ............ E21B 33/04 |
| GB | 2381546 A | | 5/2003 | |

* cited by examiner

*Primary Examiner* — Anna M Momper
*Assistant Examiner* — Patrick F Lambe
(74) *Attorney, Agent, or Firm* — Baker Botts L.L.P.

(57) ABSTRACT

An improved seal disposed at an interface of a main body of an inner drilling riser tie-back connector (ITBC) and a subsea wellhead is provided. The seal comprises a main body portion formed of a pair of opposed inwardly projecting fingers having a saw-cut profile at their ends and an outwardly projecting lever arm disposed adjacent to and at an outward angle to one of the opposed inwardly projecting fingers. Under loading the outwardly projecting lever arm imparts a bending moment to the seal, which enhances the seal created between the ITBC and the subsea wellhead and reduces the torque required to disengage the internal tie-back connector.

22 Claims, 10 Drawing Sheets

INNER DRILLING RISER TIE-BACK CONNECTOR SEAL

TECHNICAL FIELD

The present disclosure relates generally to riser tie-back connectors and, more particularly, to an improved inner drilling riser tie-back connector seal.

BACKGROUND

In drilling or production of an offshore well, risers extend between a vessel or platform at the surface and a subsea wellhead thereby connecting the vessel or platform to the subsea wellhead. In certain implementations, the riser may couple the subsea wellhead to a Blow-Out-Preventer ("BOP") located at the surface. The riser may be as long as several thousand feet, and may be made up of successive riser sections that are coupled together through one or more riser connections. Riser sections with adjacent ends may be connected on board the vessel or platform, as the riser is lowered into position. Auxiliary lines, such as choke, kill, and/or boost lines, may extend along the side of the riser to connect with the wellhead, so that fluids may be circulated downwardly into the wellhead for various purposes.

It is often desirable to use a riser which has a small inner diameter in order to facilitate fluid flow at higher pressures. For instance, during drilling operations it may be desirable to use a dual riser with an inner riser section that has a small inner diameter in order to provide a higher pressure capacity and improve the hydraulic circulation of the drilling fluid (mud) from the subsea wellhead to the surface. Stated otherwise, using a riser with a smaller diameter allows the fluids to be directed uphole at a higher velocity and with a higher pressure. In certain implementations, the smaller riser may reside inside a larger, lower pressure rated riser. It is therefore desirable to develop a tie-back connector that can couple a small diameter riser to a subsea wellhead.

BRIEF DESCRIPTION OF THE DRAWINGS

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure. To facilitate a better understanding of the present disclosure, the following examples of certain embodiments are given. In no way should the following examples be read to limit, or define, the scope of the disclosure.

The term "platform" as used herein encompasses a vessel or any other suitable component located on or close to the surface of the body of water in which a subsea wellhead is disposed. The terms "couple" or "couples," as used herein are intended to mean either an indirect or a direct connection. Thus, if a first device couples to a second device, that connection may be through a direct connection, or through an indirect (electrical and/or mechanical) connection via other devices and connections. The term "uphole" as used herein means along the drillstring or the hole from the distal end towards the subsea surface, and "downhole" as used herein means along the drillstring or the hole from the subsea surface towards the distal end. It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

Figure 1:
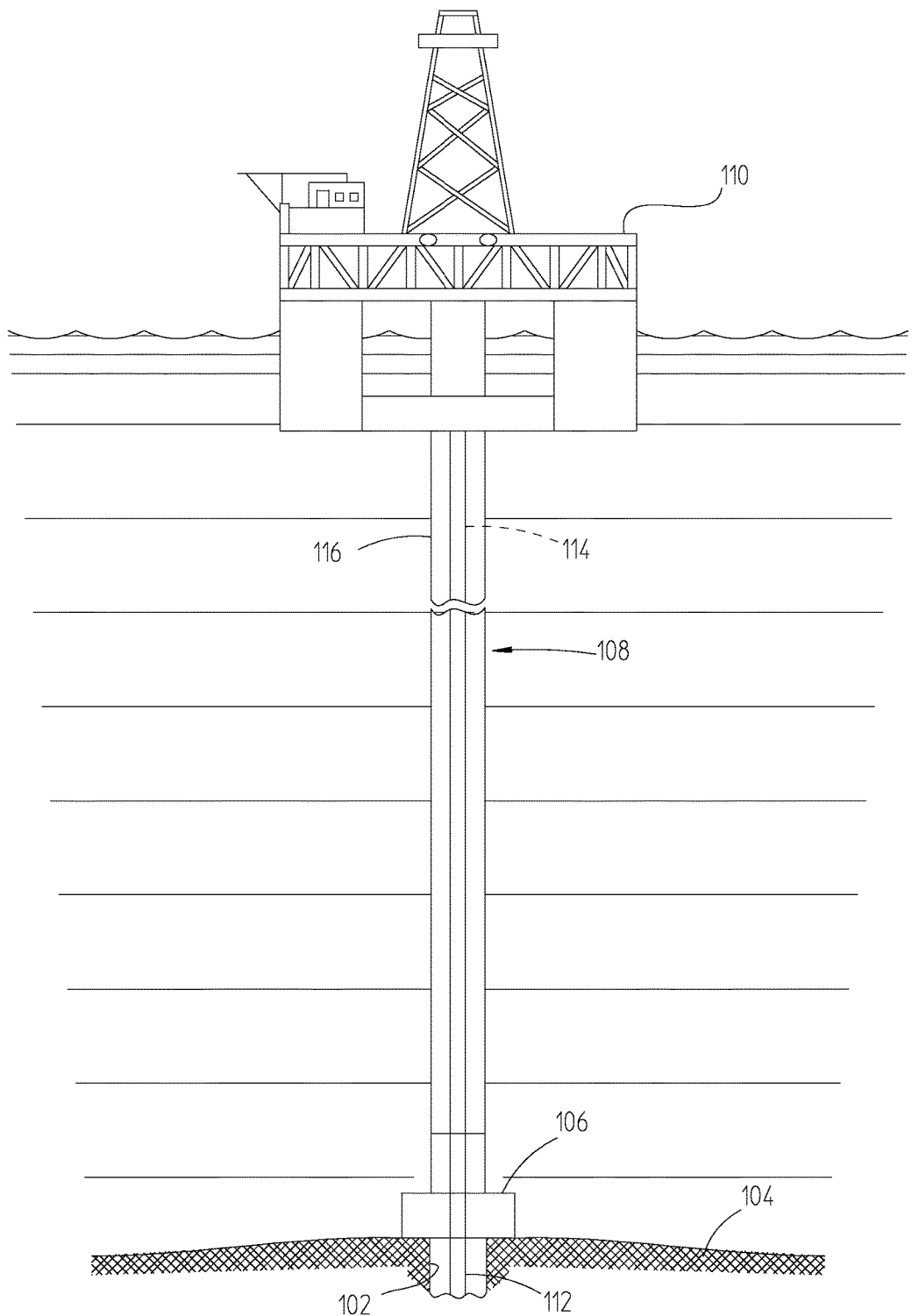
FIG. 1 is a schematic diagram illustrating a floating platform connected to a subsea wellhead by a riser having an inner diameter section and larger outer diameter section.

FIG. 1 shows a floating platform connected to a subsea wellhead by a riser having an inner diameter section and larger outer diameter section. In certain illustrative implementations, a wellbore 102 may be drilled into a subterranean formation 104. A wellhead 106 may be placed on the sea floor at an uphole terminal end of the wellbore 102. A riser 108 may then fluidically couple the wellhead 106 to the platform 110 to facilitate fluid flow between the wellhead 106 and the platform 110. Specifically, as shown in FIG. 1, a first terminal end of the riser 108 may be coupled to the platform and a second terminal end of the riser 108 may be coupled to the wellhead 106. A production pipe or a drilling pipe 112 may be inserted into the wellbore 102. Accordingly, fluids may flow between the platform 110 and the subterranean formation 104 through the riser 108, the wellhead 106 and the production pipe or the drilling pipe 112.

It is desirable to provide a fluid flow path between the subterranean formation 104 and the platform 110 that permits efficient fluid flow between the two. In accordance with an illustrative embodiment of the present disclosure which is discussed in further detail below, the riser 108 may include an inner riser pipe 114 which is installed inside an outer riser pipe 116. The term "inner riser pipe" as used herein refers to a riser pipe with an outer diameter that is less than the inner diameter of the outer riser pipe 116. In contrast, the term "outer riser pipe" as used herein refers to a riser pipe with an inner diameter that is greater than the outer diameter of the inner riser pipe 114. In order to facilitate the installation of the inner riser pipe 114 inside the outer riser pipe 116, an Inner Drilling Riser Tie-Back Connector (hereinafter "ITBC") is installed at the wellhead 106. The structure and operation of the ITBC is discussed in further detail in conjunction with FIGS. 2A-B.

Figure 2A:
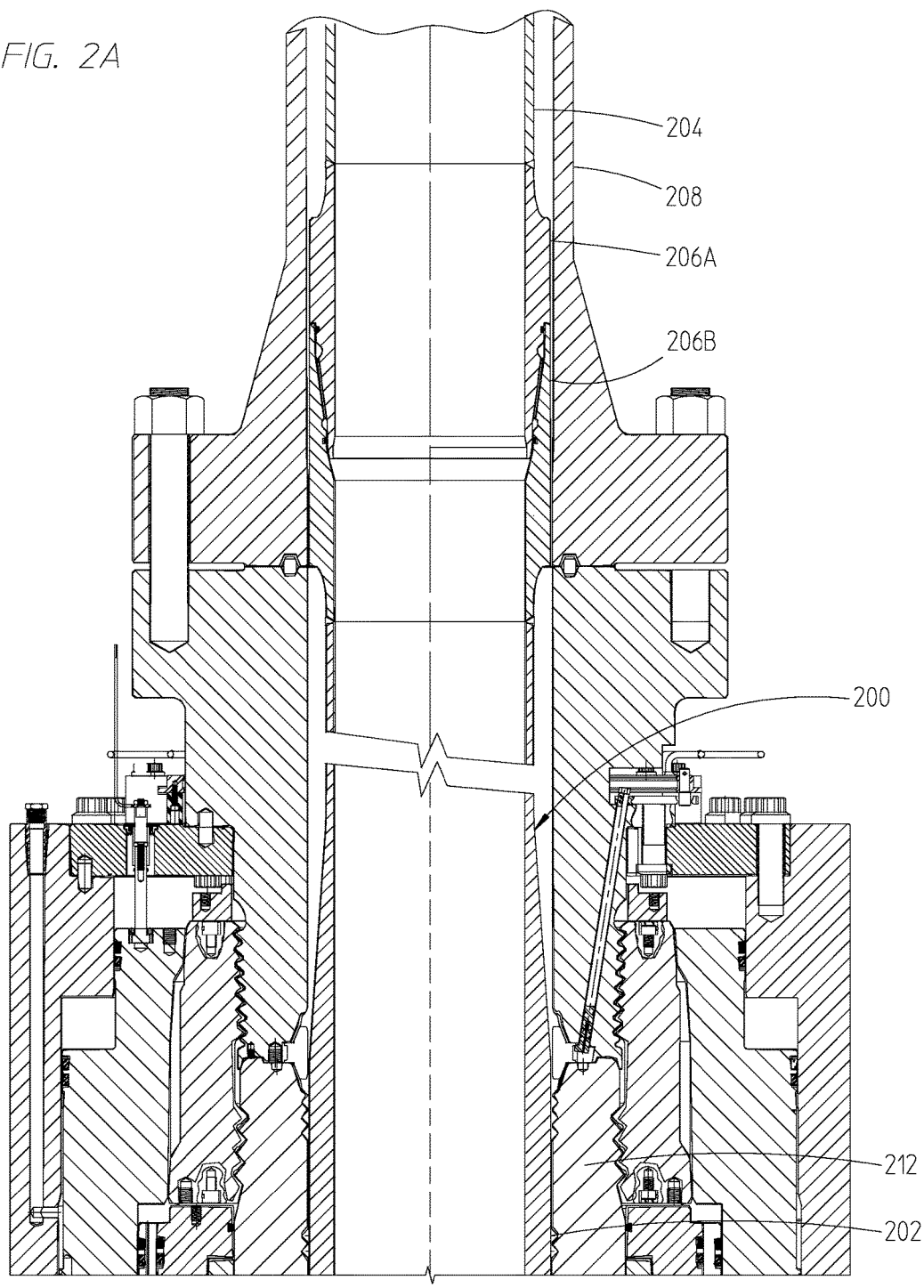
FIGS. 2A and 2B are schematic diagrams depicting the uppermost portions of a subsea wellhead system with an inner drilling riser tie-back connector shown in the locked but not fully landed position such that the metal-to-metal seal in accordance with the present disclosure is not activated.
Figure 2B:
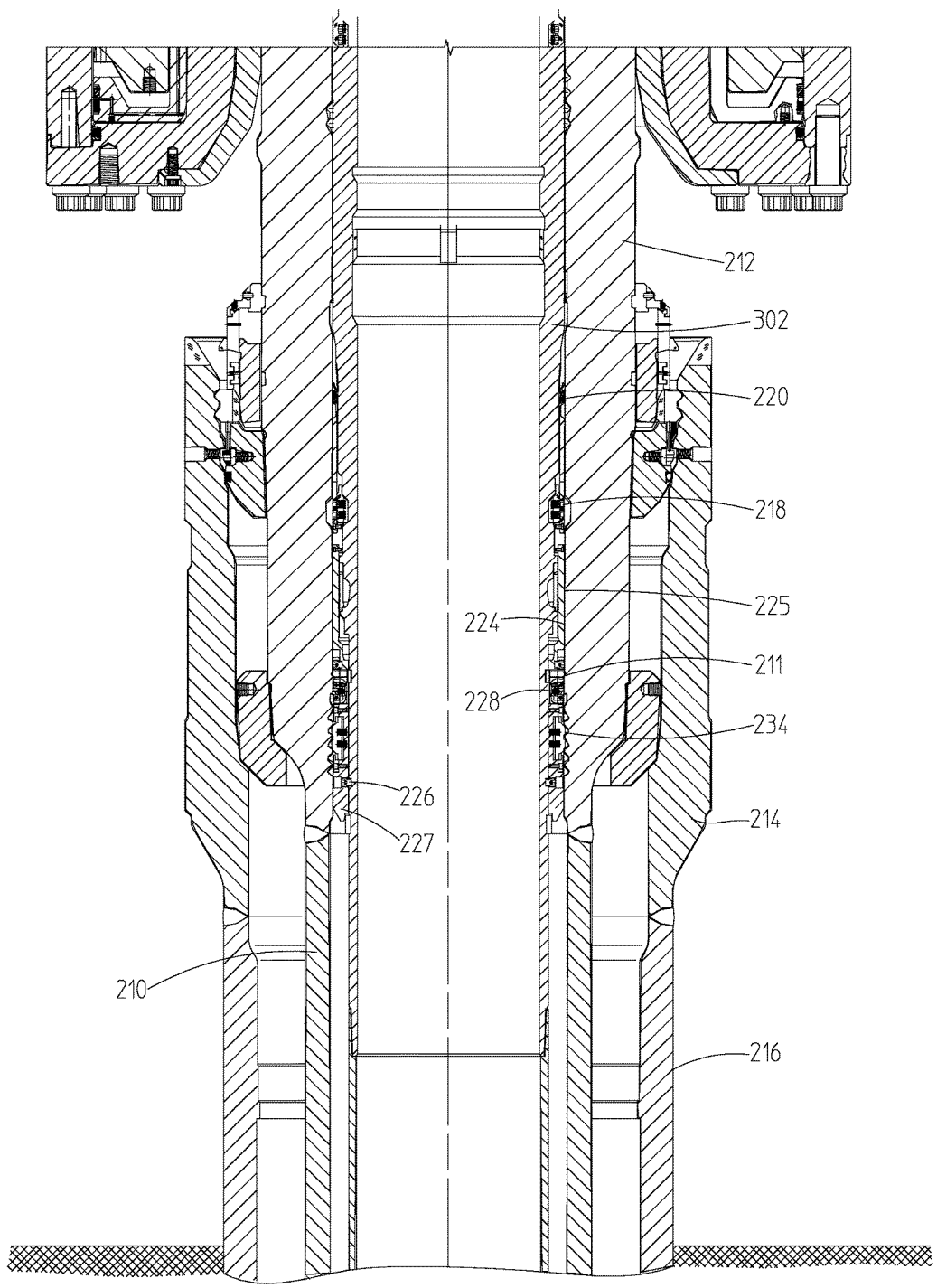
Figure 3:
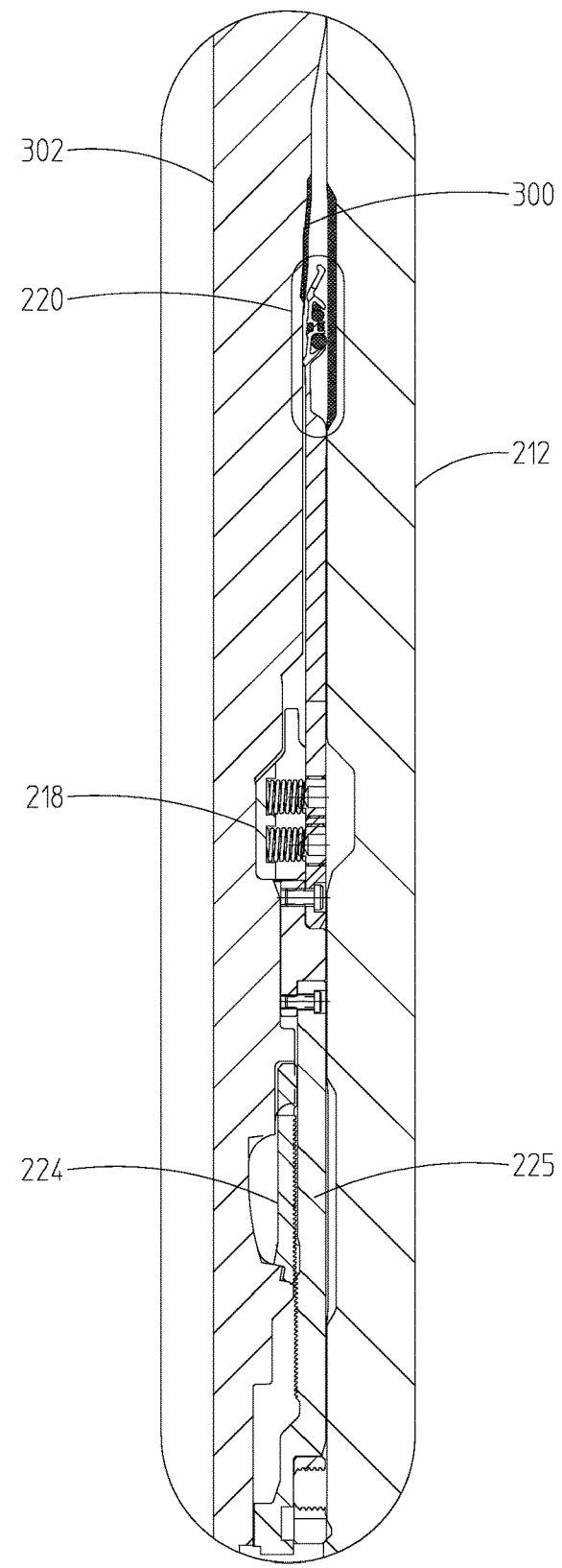
FIG. 3 is a close-up view of the interface between the inner drilling riser tie-back connector and the subsea wellhead shown in FIG. 2B showing the metal-to-metal seal in accordance with the present invention not activated.

FIGS. 2A-B and 3 depict an ITBC in accordance with an illustrative embodiment of the present disclosure which is denoted generally with reference numeral 200. Specifically, FIGS. 2A-B and 3 show the ITBC 200 locked and partially landed before the seal is activated.

Turning first to FIGS. 2A-B, the ITBC 200 may include a main body 202. The main body 202 may be coupled to an inner riser pipe 204 through one or more riser connections 206A and 206B. In the illustrative embodiment of FIG. 2, there is a threaded engagement between the main body 202, the riser connections 206A, 206B and the inner riser pipe 204. In certain implementations, the ITBC 200 may extend approximately 15-20 feet above a subsea wellhead 212 where it may be coupled to the riser connections 206A and 206B. This extension of the ITBC 200 above the subsea wellhead 212 may reduce the fatigue damage on the ITBC 200.

As shown in FIG. 2A, the inner riser pipe 204 may be positioned inside an outer riser pipe 208 and rests at a subsea wellhead 212. As shown in FIG. 2B and discussed in further detail below, the main body 202 couples the inner riser pipe 204 to a production pipe or drill pipe 210 that may be used to isolate the fluids between the subterranean formation and the subsea wellhead 212. Fluids may then flow from the production pipe 210 to the surface through the inner riser pipe 204. In certain implementations, the subsea wellhead 212 may be disposed within a low pressure housing 214. The downhole end of the low pressure housing 214 is coupled to a conductor pipe 216.

The main body 202 of the ITBC 200 may be directed downhole through the outer riser pipe 208 and lands and stops on a small shoulder 211 (referred to herein as the "landing shoulder") disposed in the lower bore of the subsea wellhead 212 as shown in FIG. 2B. After the main body 202 lands in the subsea wellhead 212, a downward weight may be applied to the main body 202. The main body 202 of the ITBC 200 may further include a locking ring 218 that is operable to engage a groove in the subsea wellhead 212 when a downward force is applied to the ITBC 200. Specifically, application of this downward weight drives out a locking ring 218 which engages a groove in the subsea wellhead 212. At the same time, the downward weight applied to the main body 202 activates a seal assembly which in certain illustrative embodiments may be a metal-to-metal seal 220 which seals in the middle bore of the subsea wellhead 212. The specific location of the metal-to-metal seal assembly 220 is shown for illustrative purposes only. Specifically, the metal-to-metal seal assembly 220 may be located at any point along the interface between the subsea wellhead 212 and the main body 202 uphole from the lock ring 218. A more detailed view of the seal assembly 220 may be seen in FIG. 3, which shows a blow up of the seal assembly 220 in the locked, but not landed (or activated position).

Any suitable mechanism known to one of ordinary skill in the art may be used to apply this downward force to the main body 202. For instance, in certain illustrative embodiments, the downward force may be applied by the weight of the inner riser pipe 204 above the ITBC 200.

In certain embodiments, a set of one or more fixed shear pins 226 are disposed on a landing ring 227. As shown in FIGS. 2A and 2B, the landing ring 227 and the shear pins 226 are disposed along an interior surface of the ITBC 200 at an interface of the subsea wellhead 212 and the main body 202 of the ITBC 200. The shear pins 226 are operable to verify accurate riser spacing before locking down the ITBC 200. These shear pins 226 allow an operator to lightly tag out on the landing shoulder 211 in the bore of the subsea wellhead 212 and verify the riser spacing at the surface is correct before committing to the lockdown of the ITBC 200. If riser length adjustments are needed, the inner riser pipe 204 can be raised to the surface and the proper length of inner joint can be installed. The inner riser pipe 204 can then be once again landed in the subsea wellhead 212.

In certain implementations, a series of spring loaded pins 228 may be disposed on the no-go sleeve 225. The spring loaded pins 228 are operable to verify that the main body 202 of the ITBC 200 has reached a desired landing point within the subsea well head 212. Specifically, this series of spring loaded pins 228 may snap into a groove in the subsea wellhead 212 when the main body 202 of the ITBC 200 is fully landed with all the inner riser pipe 204 weight down. Accordingly, an operator may use an overpull during the landing process to verify that the main body 202 has reached its desired landing point within the subsea wellhead 212.

In certain implementations, the ITBC 200 may be reusable. Specifically, the main body 202 may be landed in the subsea wellhead 212 and used to fluidically couple the inner riser pipe 204 to the production or drilling pipe 210. The main body 202 may then be released or disengaged from the subsea wellhead 212 by turning the inner riser pipe 204 which unscrews the ratch latch threading 224. In one embodiment, a clockwise movement of the inner riser pipe 204 may be used to disengage the ratch latch threading 224. The operator may then disengage the ITBC 200 and lift it in order to land the ITBC 200 a second time, if necessary.

In accordance with certain embodiments of the present disclosure, the lock ring 218 (shown in more detail in FIG. 3) is designed to withstand both tension loads and compression loads applied by the inner riser pipe 204. Specifically, once the main body 202 is installed in place, the inner riser pipe 204 will be under tension. The lock ring 218 ensures that the inner riser pipe 204 can withstand that tension. Moreover, occurrence of certain events downhole such as, for example, a blow out, can further increase the load on the lock ring 218, both in tension and compression. Therefore, in certain illustrative embodiments, the lock ring 218 may be designed to withstand a force of approximately 2 million lbs.

The lock ring 218 may be made from any suitable materials known to those of ordinary skill in the art, including, but not limited to, steel.

Moreover, the locking mechanism of the ITBC 200 has a low Stress Amplification Factor ("SAF") which provides long fatigue life and service life. The low SAF is a result of the structure of the ITBC 200. Specifically, the stress relieving contours in the ratch latch threaded ring 224 and the tight fitting engagement of the main body 202 facilitate the resulting lower SAF.

Accordingly, in operation, the ITBC 200 is directed downhole through the outer riser pipe 208 and is locked in the subsea wellhead 212, as shown in FIGS. 2A-B. A downward weight is then applied to the ITBC 200 which latches the ITBC 200 in place within the subsea wellhead 212. Specifically, as the downward force is applied to the ITBC 200, the ratch latch threaded ring 224 "clicks" as it is pushed downhole along the threads located on the no-go sleeve 225. The seal assembly 220 is set in this position. Once the desired operations are completed, the operator may rotate the inner riser pipe 204 which in turn rotates the ITBC 200, disengaging the ratch latch threaded ring 224. Accordingly, the ITBC 200 is disengaged from the subsea wellhead 212 and may be reused.

In certain implementations, one or more anti-rotation spring loaded keys 234 engage slots in the lower bore of the subsea wellhead 212. These spring loaded keys hold the load mechanism and the seal assembly stationary as the inner riser main body 202 rotates during ITBC 200 release.

In operation, the ITBC 200 lands on an empty subsea wellhead 212 (or alternatively a casing hanger) on a small landing shoulder 211 and couples to the bore of the subsea wellhead 212 with a metal-to-metal seal at the metal-to-metal seal assembly 220 while locking into a groove in the wellhead bore. In accordance with illustrative embodiments of the present disclosure, this coupling of the ITBC 200 to the subsea wellhead 212 bore may be accomplished with the weight down on the inner riser pipe 204 without requiring application of torque to rotate ITBC 200 for installation.

Figure 4:
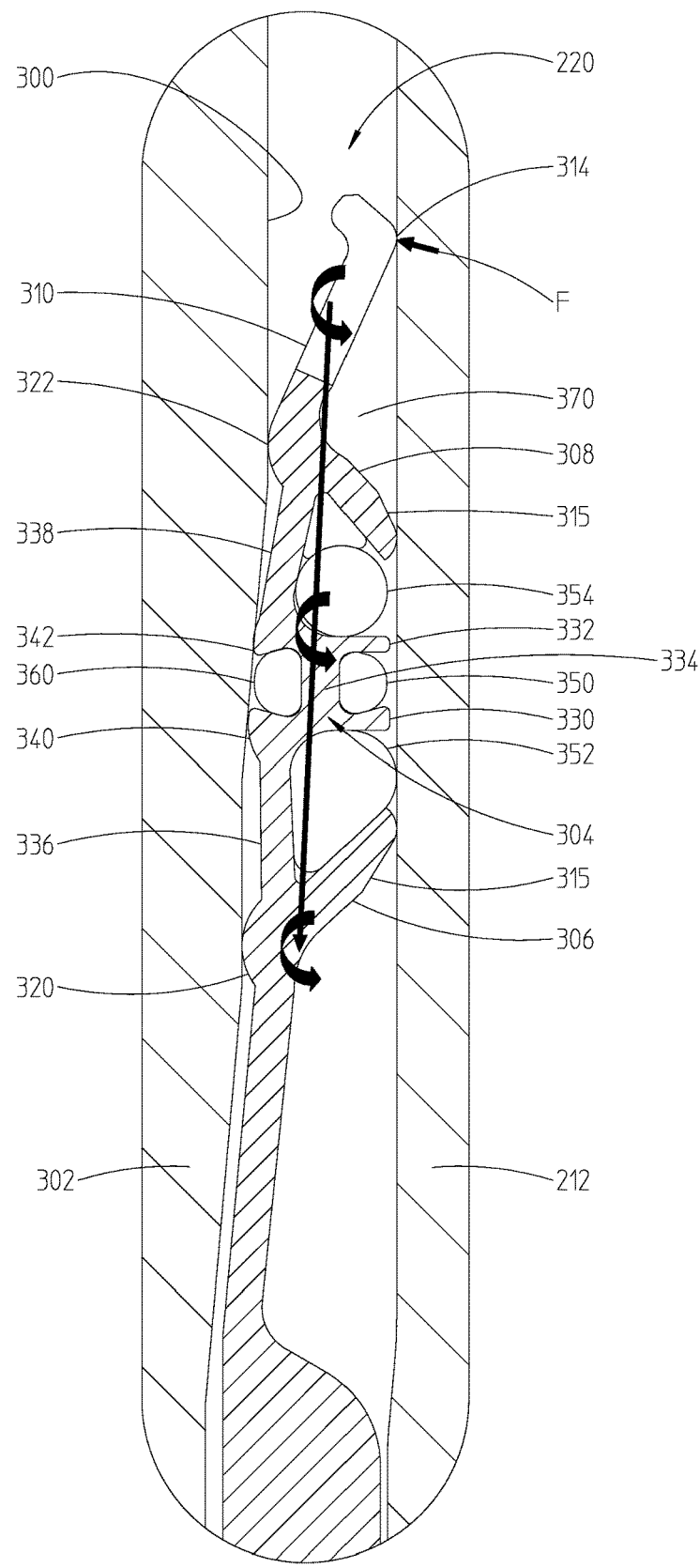
FIG. 4 is a close up of the seal between the inner drilling riser tie-back connector and the subsea wellhead shown in FIG. 3 illustrating the various components of the seal.
Figure 5:
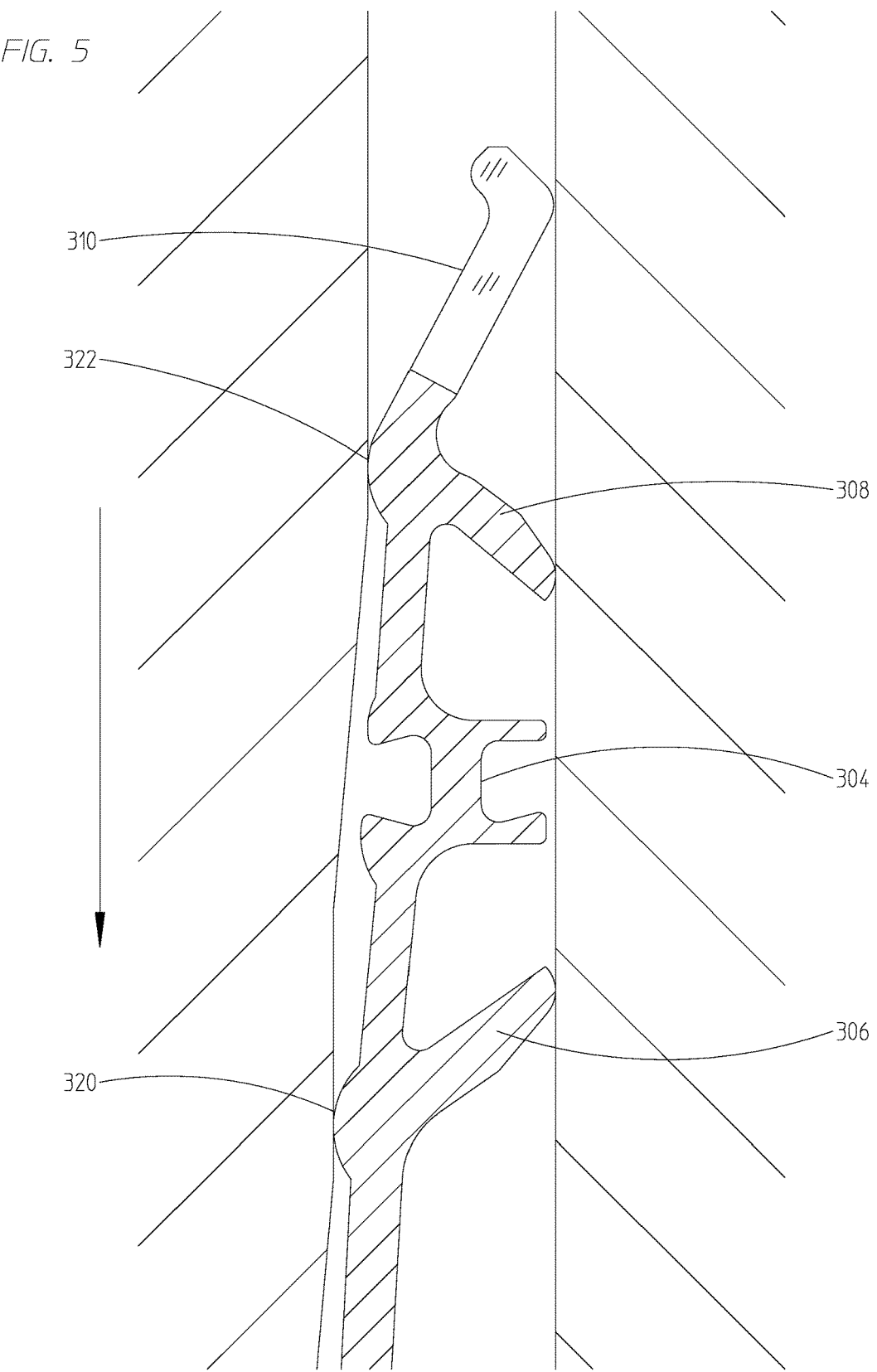
FIG. 5 is an enlarged view of the seal showing the movement of the inner body of the tieback connector relative to the seal when the tie-back connector is actuated into its locked position.
Figure 6:
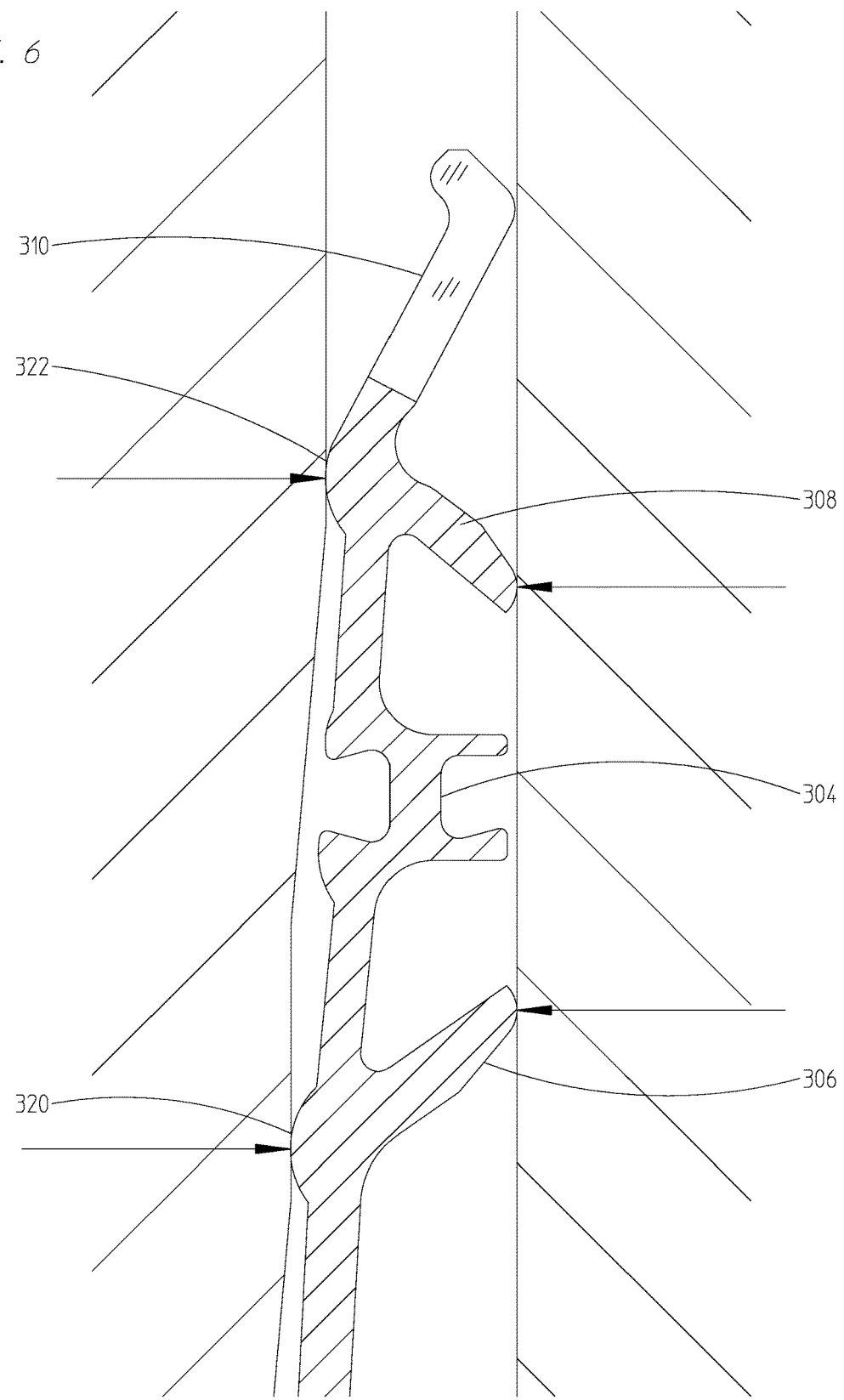
FIG. 6 shows the radial forces imposed on the seal when it is activated.

The details of the improved metal-to-metal seal assembly 220 will now be discussed with reference to FIGS. 4-9. FIG. 4 shows a blow up of the seal assembly 220. The seal assembly 220 is shown disposed at an interface of an outer surface 300 of the main body 302 of the inner drilling riser tie-back connector ("ITBC") and an inner surface of wellhead 212. The outer surface of the main body 302 of the ITBC tapers along the length of the final position of the seal assembly 220 from one end to the other. The tapered inner body is stroked downward (in a downhole direction) while the main body and seal assembly remains stationary, as shown by the arrow in FIG. 5. This results in a widening or narrowing (depending upon the end of the seal assembly 220) of the annulus between the ITBC and the subsea wellhead 212. The annulus is narrow in the region of the lever arm portion of the seal assembly 220, which is described in greater detail below.

The seal assembly or simply seal 220 comprises a main body 304, a pair of opposed inwardly projecting fingers 306 (lower) and 308 (upper) disposed on opposite sides of the main body 304, and an outwardly projecting lever arm 310 disposed adjacent to and at an outward angle to inwardly projecting upper finger 308. The lever arm 310 has a notched or saw-cut profile, which allows it to create a moment without increasing the tangential stiffness of the seal. The lever arm 310 also significantly reduces the torque required to disengage the locking mechanism when retrieving the ITBC from the well.

The outwardly projecting lever arm 310 acts to generate a bending moment when the seal 220 is set into its final position, which transfers moment down the seal body. More specifically, contact is formed at elbow 314 at the end of the outwardly projecting lever arm 310. Upon loading, the elbow 314 is thrust against the inner surface of the wellhead 212. The reactive force applied back to the seal 220 by the wellhead 212 is what creates the bending moment that transfers through the seal 220. Action of the bending moment is explained further below with reference to FIGS. 7-8, which illustrates the direction of the bending moment and how it applies throughout the seal 220.

The pair of opposed inwardly projecting fingers 306 and 308 have tapered ends 315, which are designed to facilitate their inward flexing when the seal 220 is under a load. The tapered ends of the inwardly projecting fingers 306 and 308 also help to enhance the pressure energizing contact between the inwardly projecting fingers 306 and 308 and the inner surface of the wellhead 212, which in turn enhances the seal created between the seal 220 and the wellhead 212 in that location. This tapered shape also makes the fingers thinner than conventional seals, which helps to enhance its sealing capability.

A pair of bumps 320 (lower) and 322 (upper) are formed on opposite sides of the main body of the seal 304 proximate the pair of opposed inwardly projecting fingers 306 and 308. The pair of bumps 320 and 322 abut against the main body 300 of the ITBC 302.

The main body 304 of the seal 220 is formed of a pair of generally parallel support members 330 and 332. A cross support member or bar 334 connects each of the pair of generally parallel support members to each other. The main body 304 of the seal 220 further comprises a pair of support members 336 and 338 disposed on opposite sides of, and generally orthogonal to, the pair of the generally parallel support members 330 and 332 and project outward therefrom. The main body 304 of the seal 220 further comprises a pair of bumps 340 and 342 formed on opposite sides of the generally parallel support members. The pair of bumps 340 and 342 abut against the main body 300 of the ITBC 302.

The seal 220 includes a plurality of cavities that are formed elastomeric seals, which help facilitate the seal created between the various components. One such cavity is formed between the pair of generally parallel support members 330 and 332 on one side of the cross bar. It is filled with an elastomeric seal 350. The elastomeric seal 350 is capable of forming a fluid-tight seal against the subsea wellhead 212 when the seal 220 is put under a load, i.e., activated. A pair of additional open cavities is formed on opposite sides of the generally parallel support members 330 and 332 between the pair of generally parallel support members and the inwardly projecting fingers 306 and 308. These pair of additional cavities are filled with elastomeric seals 352 and 354. The pair of additional elastomeric seals 352 and 354 is designed to form an additional seal against the subsea wellhead 212 when the seal 220 is activated.

A second open cavity is formed between the pair of generally parallel support members 330 and 332 on the opposite side of the cross bar 334. The second open cavity is also filled with an elastomeric seal 360, which is designed to form a fluid-tight seal against the main body 300 of ITBC 302 when the seal is activated. Finally, an open cavity 370 is formed between the inwardly projecting finger 308 and the outwardly projecting lever arm 310.

When the seal 220 is activated, i.e., placed under loading by movement of the main body downward, the taper in the main body applies a force on the bumps 320 and 322, which create reactive forces at the fingers 306 and 308. A complete picture of the forces on the seal upon activation can best be understood by reference to FIG. 6 and as defined by the below equation:

$$\Sigma Forces_{Bumps} = \Sigma Forces_{Fingers} + \Sigma Forces_{internalElasticForces}$$

In short, the sum of the forces applied to the bumps as the main body moves downward are counteracted by the forces at the fingers 306 and 308 and the internal elastic forces due to the stretching of the seal over the main body.

Figure 7:
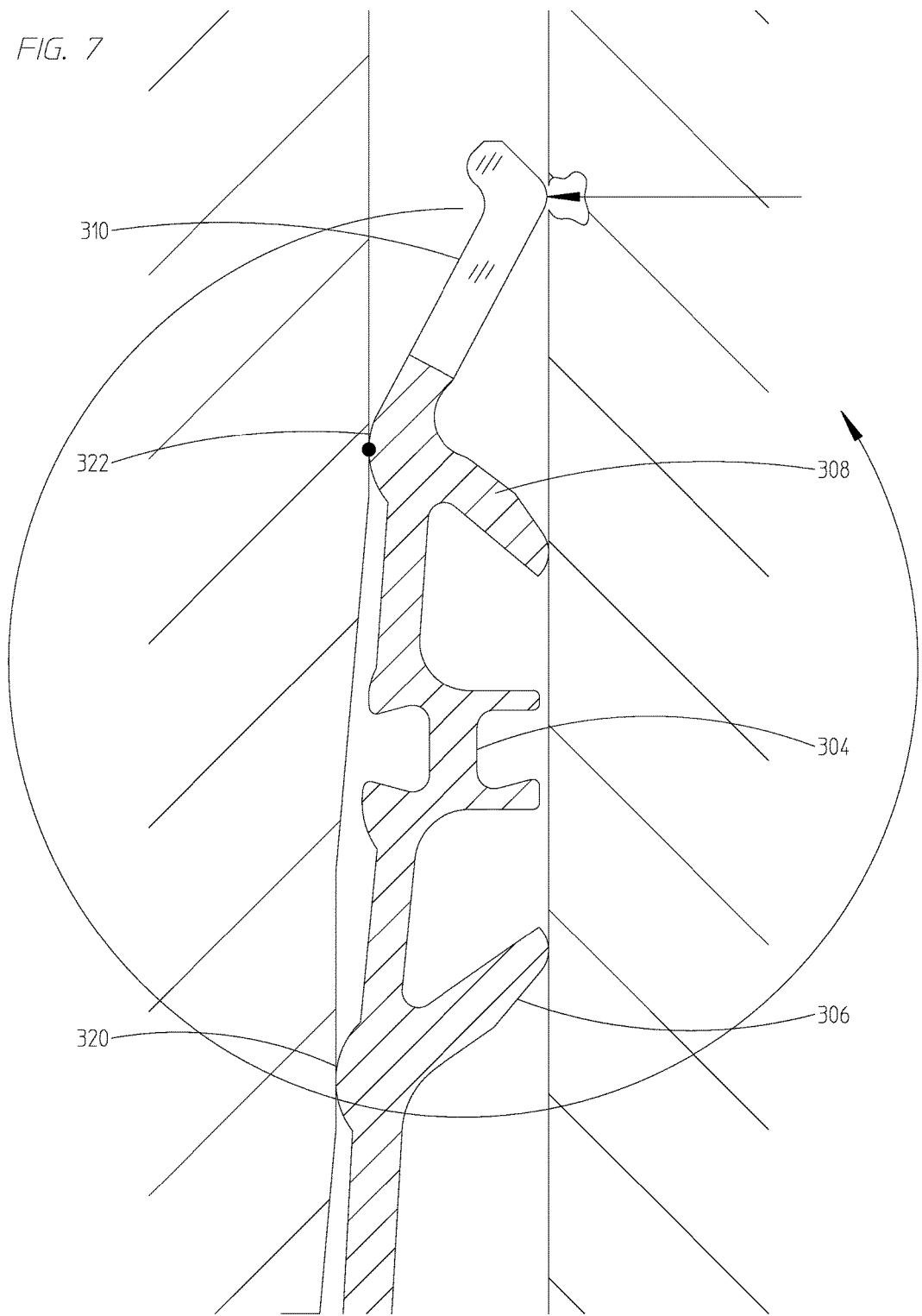
FIG. 7 illustrates the resulting bending moment imposed on the seal due to the contact forces at the elbow of a projecting lever arm of the seal in accordance with the present disclosure.
Figure 8:
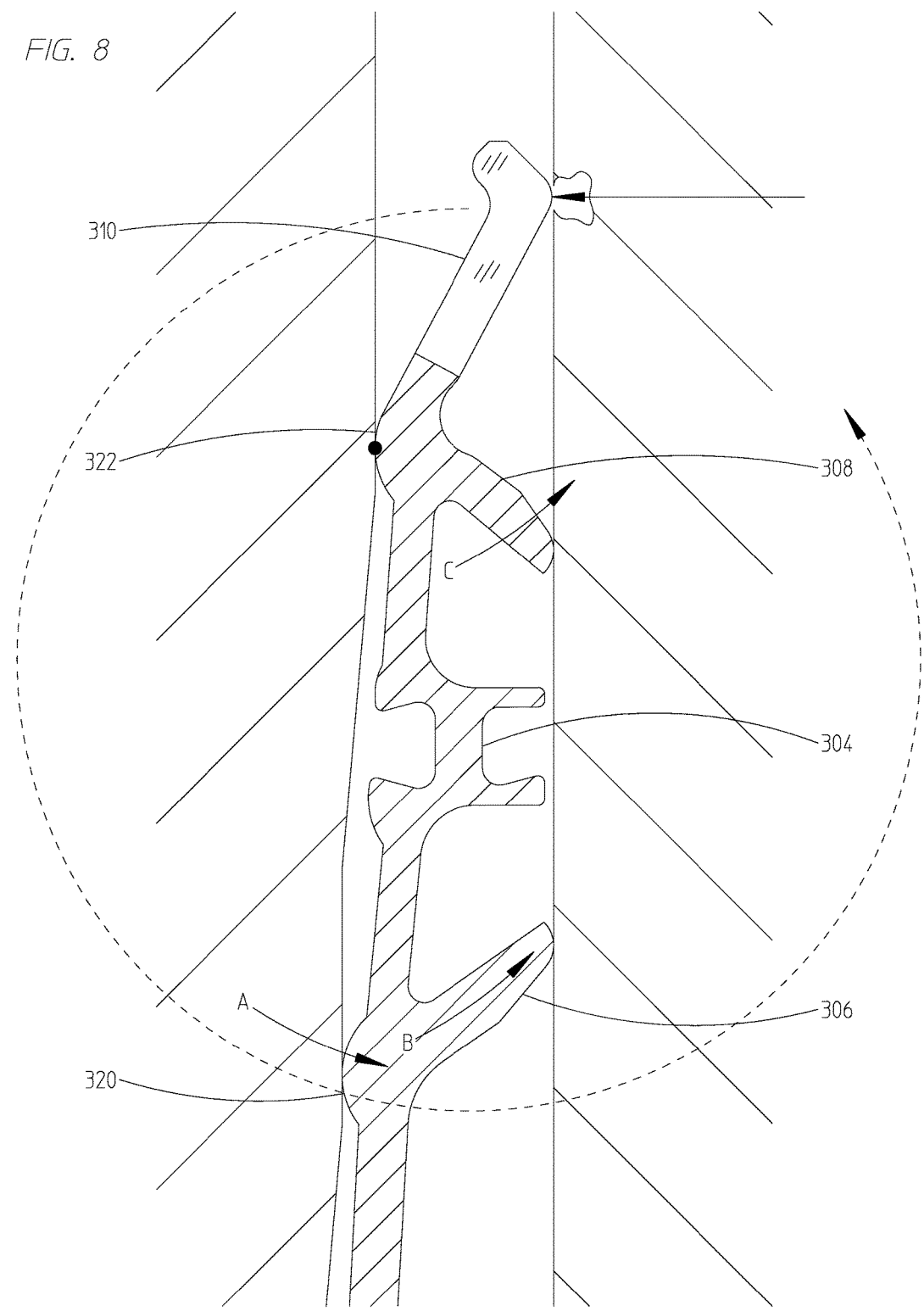
FIG. 8 illustrates the advantages of the bending on the seal.

Activation of the seal also creates a bending moment generated by the lever arm 310 contacting the inner wall of the wellhead, as further explained with reference to FIGS. 7 and 8. That bending moment is translated through the seal, as indicated by the rotating Arrows in FIG. 4. The advantages of this moment are illustrated by arrows A-C in FIG. 8. The bump 322 acts as a pivot point for translation of the bending moment through the seal. The bending moment is in turn transferred to the inwardly projecting fingers 306 and 308, as indicated by Arrows B and C. This moment creates a higher contact load for the inwardly projecting fingers 306 and 308, which helps to improve the sealing capabilities of the fingers. Furthermore, the loads on the bumps 320, 340, and 342 are lowered as a consequence of this transferred bending moment (as shown by Arrow A in FIG. 8), which helps to reduce the overall break-out torque. This design results in a significant reduction of the break-out torque without sacrificing the integrity of the seal. The break-out torque is the torque required to disengage the split ratchet ring 224 in order to allow retrieval of the ITBC from the well. Rotation is required since the locking mechanism is a threaded ring which must be unthreaded before the ITBC can be retrieved for future operations. Since the seal acts as a metal-to-metal fluid barrier between main body of the ITBC and the high pressure wellhead housing there are high contact forces on these interfaces. The high contact forces on the bumps of the seat where they interface with the main body result in a significant resistance to the axial (with regards to the axis of the riser) rotation. In general, these contact forces have to exceed the minimum sealing threshold in order for the fingers of the seal to have sufficient engagement with the wellhead 212. This is due to, in general, the contact forces on the bumps being equal to the contact force on the fingers plus the internal elastic forces due to expanding the seal, as can be seen by the formula given in the above equation. The lever arm 310 adds a bending moment as illustrated in FIG. 7. This contact at the lever arm 314 and resulting bending moment acts to take on a percentage of the internal elastic hoop forces which results in the following equation:

$$\Sigma Forces_{Bumps} = \Sigma Forces_{Fingers} + \Sigma Forces_{Internal\ Elastic\ Hoop\ Forces} + \Sigma Forces_{Lever\ arm} - \Sigma Forces_{Internal\ Elastic\ Hoop\ Forces\ Resisted\ by\ Lever\ Arm}$$

With proper design of the lever arm, the reduction in the hoop forces resisted by the lever arm can exceed the additional forces added radially inward by the contact forces between the lever arm and the wellhead which results in a net reduction to the contact forces between the seal bumps and the main body.

More specifically, the lever arm 310 reduces the break-out torque by relieving the contact force between the seal 220 and the main body thereby reducing the frictional force imparted by the seal 220 to the main body 302. This allows for lower rotation resistance (break-out torque). In one exemplary embodiment, the break-out torque is reduced from approximately 45,000 ft-lbf to approximately 30,000 ft-lbf, a reduction of approximately ⅓rd.

Figure 9:
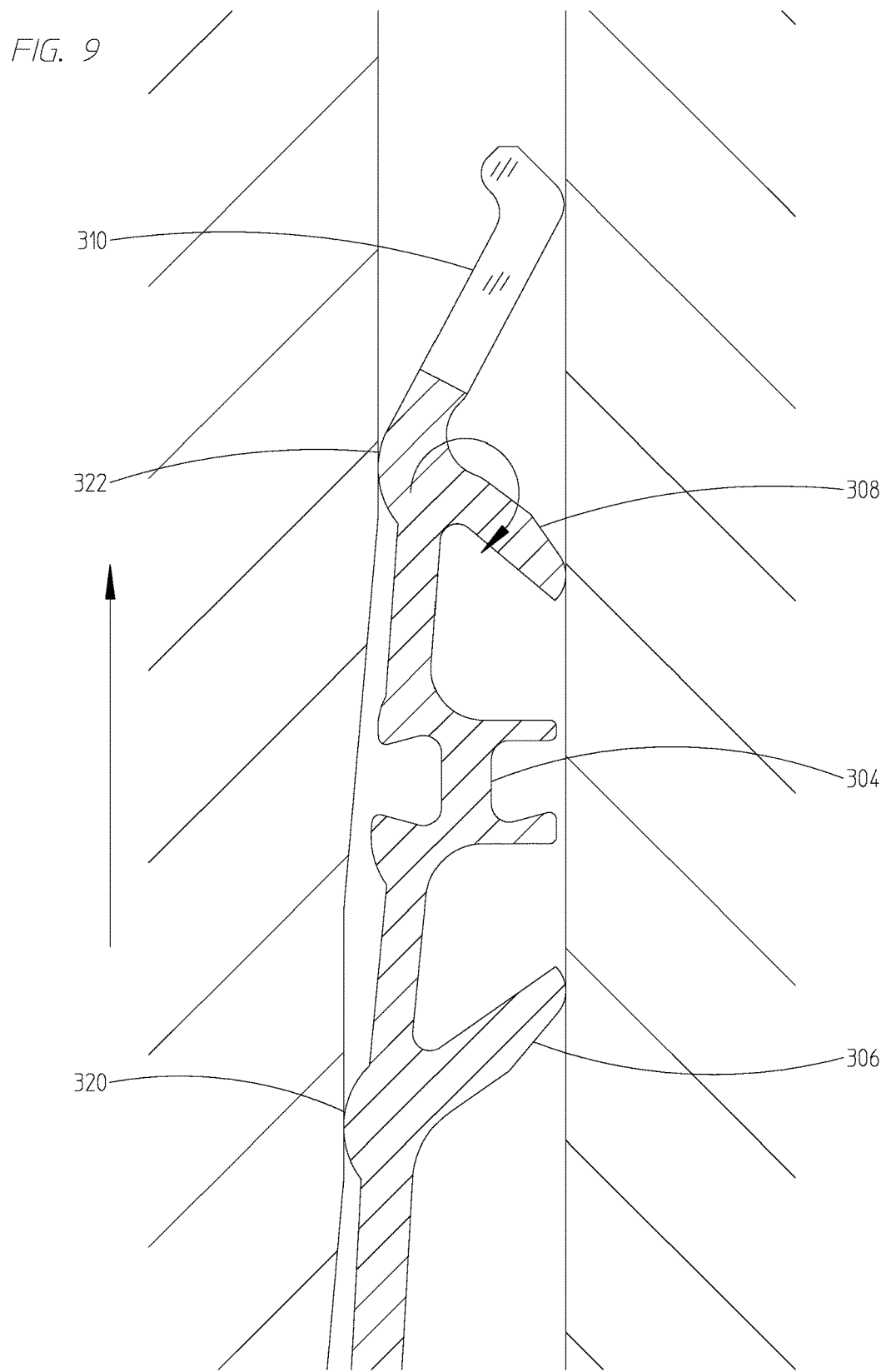
FIG. 9 illustrates the response of the seal when axial tension is applied to the tie-back connector in the up-hole direction.

The lever arm 310 also aids in preserving the integrity of the seal by preventing the adjacent finger 315 from rotating, which can weaken the contact forces between the adjacent finger and the outer body, therefore degrading the integrity of the seal. An example of a cause of this rotation is illustrated in FIG. 9. When the main body moves slightly upwards due to external tension, the frictional forces on the upper bump 322 results in a moment shown by the curved arrow in FIG. 9 that could potentially cause contact forces on the upper finger 308 to reduce if it were not for the lever arm acting to couple this moment. This would lessen the contact the upper finger 308 has with the inner surface of the wellhead 212 and thereby would otherwise weaken the seal formed between the outer surface 300 of the main body of the tie-back connector 302 and the inner surface of the wellhead 212. This effect is countered by the lever arm 310, which prevents the upper finger 308 from rotating clockwise. The lever arm 310 acts as a "kick stand" to prevent this.

The present disclosure is also directed to the entire apparatus for coupling a platform to the subsea wellhead 106 (212). The apparatus includes the riser 108 which extends between the platform 110 and the subsea wellhead 106 (212). As noted above, the riser 108 includes inner riser 204 and outer riser 208. The apparatus also includes the ITBC 302, including its main body 300. The ITBC 302 is coupled to the inner riser 204. The apparatus further includes the seal or seal assembly 220 and all of its various components, features and aspects.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. In particular, the present disclosure is not limited to tie-back connectors. The seal 220 of the present disclosure has application in other nested tubular structures, including but not limited to, casing hangers and adjustment subs. Even though the figures depict embodiments of the present disclosure in a particular orientation, it should be understood by those skilled in the art that embodiments of the present disclosure are well suited for use in a variety of orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning.

What is claimed is:

1. An apparatus for coupling a platform to a subsea wellhead comprising:
   a riser extending between the platform and the subsea wellhead, wherein the riser comprises an inner riser and an outer riser;
   an inner drilling riser tie-back connector ("ITBC") having a main body, wherein the ITBC is coupled to the inner riser;
   a seal positioning device disposed between the main body of the ITBC and the subsea wellhead; and
   a seal disposed at an end of the seal positioning device, wherein the seal positioning device is positioning the seal at an interface directly between the main body of the ITBC and the subsea wellhead and connecting the seal to at least one other component in the annulus, wherein the seal comprises:
      a main body comprising a first end and a second end opposite the first end, wherein the first end of the seal is disposed at the end of the seal positioning device and the second end of the seal extends axially away from the end of the seal positioning device;
      a first inwardly projecting finger disposed on the first end of the main body of the seal and projecting at an angle axially toward the second end of the main body of the seal and radially toward a radially inner surface of the subsea wellhead;
      a second inwardly projecting finger disposed on the second end of the main body of the seal and projecting at an angle axially toward the first end of the main body of the seal and radially toward the radially inner surface of the subsea wellhead, wherein the first and second inwardly projecting fingers project at opposing angles to each other; and
      an outwardly projecting lever arm disposed on the second end of the main body of the seal, wherein the outwardly projecting lever arm is adjacent to and at an outward angle to the second inwardly projecting finger, wherein the outwardly projecting lever arm is projecting at an angle axially away from the first end of the main body of the seal and radially toward the radially inner surface of the subsea wellhead.

2. The apparatus of claim 1, wherein the outwardly projecting lever arm has a notched or saw-cut profile.

3. The apparatus of claim 1, wherein the outwardly projecting lever arm acts to minimize rotation of the second inwardly projecting finger, therefore improving the integrity of the seal.

4. The apparatus of claim 1, further comprising a pair of bumps formed at opposite sides of the main body of the seal proximate the first and second inwardly projecting fingers, the pair of bumps abutting against the main body of the ITBC.

5. The apparatus of claim 1, wherein the main body of the seal comprises a pair of generally parallel support members, a cross bar connecting each of the pair of generally parallel support members to each other, and a pair of support members disposed on opposite sides of, and generally orthogonal to, the pair of the generally parallel support members and projecting outward therefrom.

6. The apparatus of claim 5, further comprising a pair of bumps formed on opposite sides of the generally parallel support members, the pair of bumps abutting against the main body of the ITBC.

7. The apparatus of claim 5, further comprising an elastomeric seal disposed in a first open cavity which is formed between the pair of generally parallel support members on one side of the cross bar.

8. The apparatus of claim 7, further comprising an elastomeric seal disposed in a second open cavity which is formed between the pair of generally parallel support members on an opposite side of the cross bar.

9. The apparatus of claim 5, further comprising a pair of elastomeric seals disposed in an associated pair of open cavities which are formed on opposite sides of the generally parallel support members between the pair of generally parallel support members and the first and second inwardly projecting fingers.

10. The apparatus of claim 1, wherein a radially outer surface of the main body of the inner drilling riser tie-back connector tapers in a radially outward direction from the first end of the seal to the second end of the seal.

11. A seal assembly for use in an oil drilling or production application to act as a fluid barrier in the annulus between an inner and outer body comprising:
    a seal; and
    a seal positioning device configured to position the seal within the annulus and to connect the seal to at least one other component in the annulus, wherein the seal is disposed at an end of the seal positioning device;
    wherein the seal comprises:
       a main body comprising a first end and a second end opposite the first end, wherein the first end of the main body is disposed at the end of the seal positioning device and the second end of the main body extends axially away from the end of the seal positioning device;
       a first inwardly projecting finger disposed on the first end of the main body and projecting at an angle radially outward and axially toward the second end of the main body
       a second inwardly projecting finger disposed on the second end of the main body of the seal and projecting at an angle radially outward and axially toward the first end of the main body, wherein the first and second inwardly projecting fingers project at opposing angles to each other; and
       an outwardly projecting lever arm disposed on the second end of the main body, wherein the outwardly projecting lever arm is adjacent to and at an outward angle to the second inwardly projecting finger, wherein the outwardly projecting lever arm is projecting at an angle radially outward and axially away from the first end of the main body.

12. The seal assembly of claim 11, herein the outwardly project lever arm has a notched or saw-cut profile.

13. The seal assembly of claim 11, wherein the outwardly projecting lever arm acts to impart a bending moment to the seal upon loading.

14. The seal assembly of claim 11, further comprising a pair of bumps formed at opposite sides of the main body proximate the first and second inwardly projecting fingers, the pair of bumps abutting against the inner body when the seal is installed.

15. The seal assembly of claim 11, wherein the main body comprises a pair of generally parallel support members, a cross bar connecting each of the pair of generally parallel support members to each other, and a pair of support members disposed on opposite sides of, and generally orthogonal to, the pair of the generally parallel support members and projecting outward therefrom.

16. The seal assembly of claim 15, further comprising a pair of bumps formed on opposite sides of the generally parallel support members, the pair of bumps abutting against the inner body when the seal is installed.

17. The seal assembly of claim 15, further comprising an elastomeric seal disposed in a first open cavity which is formed between the pair of generally parallel support members on one side of the cross bar.

18. The seal assembly of claim 17, further comprising a pair of elastomeric seals disposed in an associated pair of open cavities, which are formed on opposite sides of the generally parallel support members between the pair of generally parallel support members and the first and second inwardly projecting fingers; and an elastomeric seal disposed in a second open cavity which is formed between the pair of generally parallel support members on an opposite side of the cross bar.

19. The seal assembly of claim 11, wherein the outwardly projecting lever arm reduces break-out torque.

20. The seal assembly of claim 11, wherein the outwardly projecting lever arm acts to minimize inward rotation of the second inwardly projecting finger, thereby improving the integrity of the seal by acting as a stand for the second inwardly projecting finger.

21. The seal assembly of claim 11, wherein the outwardly projecting lever arm comprises an elbow at a radially outermost end thereof, wherein the elbow projects from the radially outermost end of the lever arm in a radially inward direction and at an angle away from the main body.

22. The seal assembly of claim 11, wherein an open cavity is formed between the second inwardly projecting finger and the outwardly projecting lever arm.

* * * * *